United States Patent
Zhang et al.

(10) Patent No.: US 11,956,337 B2
(45) Date of Patent: Apr. 9, 2024

(54) MESSAGE PARSING METHOD, DATA TRANSMIT END, DATA RECEIVE END, AND SYSTEM

(71) Applicant: Huawei Technologies Co., Ltd., Shenzhen (CN)

(72) Inventors: Kai Zhang, Xi'an (CN); Liang Chen, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 217 days.

(21) Appl. No.: 17/407,705

(22) Filed: Aug. 20, 2021

(65) Prior Publication Data

US 2021/0385309 A1 Dec. 9, 2021

Related U.S. Application Data

(63) Continuation of application No. PCT/CN2019/075752, filed on Feb. 21, 2019.

(51) Int. Cl.
H04L 69/22 (2022.01)
H04L 45/74 (2022.01)
H04L 69/321 (2022.01)

(52) U.S. Cl.
CPC .......... H04L 69/22 (2013.01); H04L 69/321 (2013.01)

(58) Field of Classification Search
None
See application file for complete search history.

(56) References Cited

U.S. PATENT DOCUMENTS 7,134,072 B1 * 11/2006 Lovett ................ G06F 40/154
715/234
8,522,136 B1 * 8/2013 Kumar ................ G06F 40/143
715/239

(Continued)

FOREIGN PATENT DOCUMENTS

CN 101071446 A 11/2007
CN 101329665 A 12/2008

(Continued)

OTHER PUBLICATIONS

Chappell, D.A., "Chapter 4. XML: The Foundation for Business Data Integration", O"Reilly Media, Inc., =ISBN: 9780596006754, Jun. 2004, 23 pages.

(Continued)

Primary Examiner — Duc T Duong
(74) Attorney, Agent, or Firm — Slater Matsil, LLP

(57) ABSTRACT

This application provides a message parsing method, a data transmit end, a data receive end, and a system, and pertains to the field of network technologies. The method includes: when creating an XML message, the data transmit end may add a target identifier to the XML message to indicate an independent message block in the XML message, where the independent message block is an independent context-free message block, and then may transmit the XML message to the data receive end; and in a process of receiving the XML message, if it is detected that the target identifier exists in the XML message, the data receive end may capture, from the XML message, the independent message block corresponding to the target identifier, and then parse the captured independent message block.

13 Claims, 5 Drawing Sheets

(56) References Cited

U.S. PATENT DOCUMENTS

| | | | |
|---|---|---|---|
| 9,369,382 B2* | 6/2016 | Azulai | H04L 45/72 |
| 2006/0155726 A1 | 7/2006 | Krasun et al. | |
| 2007/0028163 A1* | 2/2007 | Meijer | G06F 16/8358 |
| | | | 715/236 |
| 2008/0141112 A1* | 6/2008 | Aoki | G06F 40/221 |
| | | | 715/234 |
| 2009/0300477 A1* | 12/2009 | Soulier | G06F 40/154 |
| | | | 715/234 |
| 2010/0088588 A1* | 4/2010 | Fablet | G06F 40/143 |
| | | | 715/234 |
| 2010/0138442 A1* | 6/2010 | Shinkawa | G06F 16/278 |
| | | | 707/769 |
| 2010/0306273 A1* | 12/2010 | Branigan | G06F 16/81 |
| | | | 707/673 |
| 2011/0320926 A1* | 12/2011 | Agarwal | G06F 16/83 |
| | | | 715/234 |
| 2014/0095519 A1* | 4/2014 | Liu | G06F 16/8373 |
| | | | 707/769 |
| 2014/0101538 A1* | 4/2014 | Style | G06F 40/143 |
| | | | 715/234 |
| 2014/0244692 A1* | 8/2014 | Williamson | G06F 16/83 |
| | | | 707/791 |
| 2014/0297670 A1* | 10/2014 | Arshad | G06F 40/154 |
| | | | 707/756 |
| 2015/0120654 A1 | 4/2015 | Shan et al. | |
| 2015/0286746 A1* | 10/2015 | Christoph | G06F 40/205 |
| | | | 707/755 |
| 2016/0070815 A1* | 3/2016 | Carlsson | G06F 16/81 |
| | | | 707/741 |
| 2019/0034392 A1* | 1/2019 | Medlyn | G06F 40/149 |

FOREIGN PATENT DOCUMENTS

| | | |
|---|---|---|
| CN | 101976244 A | 2/2011 |
| CN | 104753891 A | 7/2015 |
| CN | 107301207 A | 10/2017 |
| KR | 101553660 B1 | 9/2015 |

OTHER PUBLICATIONS

Enns, R. et al., "Network Configuration Protocol (NETCONF)", RFC 6241, Internet Engineering Task Force (IETF), Jun. 2011, 113 pages.

* cited by examiner

MESSAGE PARSING METHOD, DATA TRANSMIT END, DATA RECEIVE END, AND SYSTEM

CROSS-REFERENCE TO RELATED APPLICATIONS

This application is a continuation of International Application No. PCT/CN2019/075752, filed on Feb. 21, 2019, the disclosure of which is hereby incorporated by reference in its entirety.

TECHNICAL FIELD

This application relates to the field of network technologies, and in particular, to a message parsing method, a data transmit end, a data receive end, and a system.

BACKGROUND

A NETCONF Protocol, as a general configuration protocol for network devices, has been widely supported by the network devices. For example, in a software defined networking (SDN) structure, data transmission is performed between a controller and a forwarder by using the NETCONF protocol. When the NETCONF protocol is used for data transmission, a format of an extensible markup language (XML) message is generally used to carry data.

In the related art, when the format of the XML message is used to carry data, a document object model (DOM) is generally used for parsing. A specific parsing manner is: parsing the XML message into a tree-like structure, where the structure is referred to as a node tree. In the node tree, a wrapping relationship is used to describe a relationship between nodes. Generally, a root node includes a parent node vertically, the parent node includes a child node vertically, and a sibling node is a horizontal node.

In a process of implementing this application, the inventor finds that the related art has at least the following problem.

When the DOM is used for parsing, horizontal access and vertical access are performed by using the root node. Therefore, when the DOM is used for parsing, the entire XML message needs to be entirely cached in a memory before an operation can be performed on the XML message. Therefore, an extremely high requirement is posed on a memory storage capacity. It is not suitable for parsing a message with a large amount of data. Therefore, a manner of parsing a message with a large amount of data needs to be provided.

SUMMARY

To resolve a problem in the related art, embodiments of this application provide a message parsing method, a data transmit end, a data receive end, and a system. The technical solutions are as follows:

According to a first aspect, a message parsing method is provided. The method includes: receiving an extensible markup language XML message; in a process of receiving the XML message, capturing, from the XML message if it is detected that a target identifier exists in the XML message, an independent message block corresponding to the target identifier; and parsing the independent message block.

The target identifier may be preset and stored at a data receive end. The target identifier may be used to represent that the corresponding message block is an independent context-free independent message block.

In the solution shown in this embodiment of this application, the data receive end may receive the XML message transmitted by a data transmit end. In the process of receiving the XML message, if it is detected that the target identifier exists in the XML message, the independent message block corresponding to the target identifier may be captured from the XML message. In this way, the independent context-free independent message block can be obtained. Then the independent message block may be parsed. In this way, in the process of receiving the XML message, the encountered independent message block can be directly captured and then parsed, and there is no need to cache the entire XML message in a memory. Therefore, a requirement on a memory storage capacity can be relatively reduced. The solution is applicable to parsing of a message with a large amount of data. Therefore, a manner of parsing a message with a large amount of data is provided.

In a possible implementation, the method further includes: parsing, through a SAX, a message block of a node whose target identifier does not exist in the XML message.

In the solution shown in this embodiment of this application, for nodes whose target identifiers do not exist, the data receive end may obtain messages of these nodes, and parse the messages by using the simple XML interface (Simple API for XML, SAX), that is, after all the messages of these nodes are received, read the messages from a cache line by line, identify the following events, such as an XML start, an XML end, a tag start, a tag end, a substring value, and an exception, and trigger parsing in each event. In this way, after being cached, other messages than the independent message block can also be read line by line through the SAX. Therefore, the messages can also be parsed while being scanned, and memory occupation is relatively low.

In a possible implementation, the method further includes: if it is detected that no target identifier exists in the XML message, parsing the XML message through the SAX.

In the solution shown in this embodiment of this application, if the data receive end does not detect any target identifier in the entire XML message, the data receive end may parse the XML message through the SAX, that is, after the XML message is cached, the data receive end reads the XML message from the cache line by line, identifies the following events, such as an XML start, an XML end, a tag start, a tag end, a substring value, and an exception, and triggers parsing in each event. In this way, when there is no independent message block, after the XML message is cached, the XML message can also be read line by line through the SAX. Therefore, the XML message can also be parsed while being scanned, and memory occupation is relatively low.

In a possible implementation, the capturing, from the XML message, an independent message block corresponding to the target identifier includes: in the XML message, determining, leftward from a location of the target identifier, a start point of the independent message block corresponding to the target identifier, and determining, rightward from the location of the target identifier, an end point of the independent message block corresponding to the target identifier; and capturing, from the XML message based on the start point and the end point, the independent message block corresponding to the target identifier.

In the solution shown in this embodiment of this application, when it is determined that the target identifier exists in the XML message, the start point of the independent message block corresponding to the target identifier may be determined leftward from the location of the target identifier, and the end point of the independent message block corresponding to the target identifier may be determined rightward from the location of the target identifier; and then the independent message block between the start point and the end point may be captured from the XML message. In this way, the independent message block corresponding to the target identifier can be captured. In this way, because the start point and the end point may be used for capture directly, capture efficiency can be improved.

In a possible implementation, the target identifier is an attribute value of an attribute of a node; and the capturing, from the XML message if it is detected that a target identifier exists in the XML message, an independent message block corresponding to the target identifier includes: if it is detected that an attribute value of an attribute of a target node in the XML message is the target identifier, capturing, from the XML message based on the target node, the independent message block corresponding to the target identifier.

In the solution shown in this embodiment of this application, when detecting that the attribute value of the attribute of the node (that is, the target node) in the message is the target identifier, the data receive end may capture, from the XML message based on the target identifier, the independent message block corresponding to the target identifier. In this way, the target identifier may be the attribute value of the attribute of the node.

In a possible implementation, the capturing, from the XML message based on the target node, the independent message block corresponding to the target identifier includes: if the target node does not include any child node, capturing, from the XML message, an independent message block corresponding to the target node; or if the target node includes a child node, capturing, from the XML message, independent message blocks corresponding to the target node and the child node included in the target node.

In the solution shown in this embodiment of this application, when detecting that the attribute value of the attribute of the node (that is, the target node) in the message is the target identifier, the data receive end may determine whether the target node includes any child node. If the target node does not include any child node, a start point and an end point of the independent message block corresponding to the target node may be determined, and then the independent message block between the start point and the end point is captured from the XML message. If the target node includes a child node, start points and end points of independent message blocks corresponding to the target node and the child node included in the target node may be determined, and then the independent message blocks between the start points and the end points are captured from the XML message.

In a possible implementation, the target identifier is a node name of a parent node; and the capturing, from the XML message if it is detected that a target identifier exists in the XML message, an independent message block corresponding to the target identifier includes: if it is detected that a parent node whose node name is the target identifier exists in the XML message, capturing, from the XML message, an independent message block corresponding to a child node included in the parent node whose node name is the target identifier.

In the solution shown in this embodiment of this application, when determining that the node name of the parent node is the target identifier, the data receive end may determine the child node included in the parent node, then determine a start point and an end point of the independent message block corresponding to the child node, and then capture the independent message block between the start point and the end point from the XML message, where the independent message block is an independent message block that can be independently parsed. In this way, the target identifier may be the node name of the parent node.

According to a second aspect, a message parsing method is provided. The method includes: when creating an extensible markup language XML message, adding a target identifier to the XML message to indicate an independent message block in the XML message, where the independent message block is an independent context-free message block; and transmitting the XML message to a data receive end.

In the solution shown in this embodiment of this application, a data transmit end needs to transmit an XML message to the data receive end. During creation of the XML message, if a message block in the XML message is an independent context-free message block, the message block is an independent message block, and a target identifier may be added to the independent message block. If no message block in the XML message is an independent context-free message block, the XML message may be directly created. Then the created XML message is transmitted to the data receive end. In this way, because the target identifier is added to the independent message block, the data receive end can identify the independent message block, and parse the independent message block concurrently when receiving the independent message block, and does not need to wait to parse the XML message until the entire XML message is cached, thereby reducing cache memory occupation.

In a possible implementation, the target identifier is an attribute value of an attribute of a node; and the adding a target identifier to the XML message to indicate an independent message block in the XML message includes: determining, in the XML message, the independent message block in the XML message; and setting the attribute value of the attribute of the node to which the determined independent message block belongs, to the target identifier.

In the solution shown in this embodiment of this application, the data transmit end may determine, in the XML message, the context-free message block as the independent message block, then obtain an identifier bit of the attribute value of the attribute of the node to which the determined independent message block belongs, and add the target identifier to the identifier bit. In this way, the attribute value of the attribute of the node to which the determined independent message block belongs is the target identifier.

In a possible implementation, the target identifier is a node name of a parent node; and the adding a target identifier to the XML message to indicate an independent message block in the XML message includes: determining, in the XML message, the independent message block in the XML message; and adding the parent node for a node to which the determined independent message block belongs, where the node name of the added parent node is the target identifier.

In the solution shown in this embodiment of this application, the data transmit end may determine, in the XML message, the context-free message block as the independent message block, and then add the parent node whose node name is the target identifier for the node to which the determined independent message block belongs. In this way, the node name of the added parent node is the target identifier.

According to a third aspect, a data receive end for message parsing is provided. The data receive end includes a receiver, a memory, and a processor, where the receiver is configured to receive an extensible markup language XML message; and the processor is configured to: in a process of receiving the XML message, capture, from the XML message if it is detected that a target identifier exists in the XML message, an independent message block corresponding to the target identifier; and parse the independent message block.

In a possible implementation, the processor is further configured to: parse, through a SAX, a message block of a node whose target identifier does not exist in the XML message.

In a possible implementation, the processor is further configured to: if it is detected that no target identifier exists in the XML message, parse the XML message through the SAX.

In a possible implementation, the processor is configured to: in the XML message, determine, leftward from a location of the target identifier, a start point of the independent message block corresponding to the target identifier, and determine, rightward from the location of the target identifier, an end point of the independent message block corresponding to the target identifier; and capture, from the XML message based on the start point and the end point, the independent message block corresponding to the target identifier.

In a possible implementation, the target identifier is an attribute value of an attribute of a node; and the processor is configured to: if it is detected that an attribute value of an attribute of a target node in the XML message is the target identifier, capture, from the XML message based on the target node, the independent message block corresponding to the target identifier.

In a possible implementation, the processor is configured to: if the target node does not include any child node, capture, from the XML message, an independent message block corresponding to the target node; or if the target node includes a child node, capture, from the XML message, independent message blocks corresponding to the target node and the child node included in the target node.

In a possible implementation, the target identifier is a node name of a parent node; and the processor is configured to: if it is detected that a parent node whose node name is the target identifier exists in the XML message, capture, from the XML message, an independent message block corresponding to a child node included in the parent node whose node name is the target identifier.

According to a fourth aspect, a data transmit end for message parsing is provided. The data transmit end includes a processor, a transmitter, and a memory, where the processor is configured to: when creating an extensible markup language XML message, add a target identifier to the XML message to indicate an independent message block in the XML message, where the independent message block is an independent context-free message block; and the transmitter is configured to transmit the XML message to a data receive end.

In a possible implementation, the target identifier is an attribute value of an attribute of a node; and the processor is configured to: determine, in the XML message, the independent message block in the XML message, and set the attribute value of the attribute of the node to which the determined independent message block belongs, to the target identifier.

In a possible implementation, the target identifier is a node name of a parent node; and the processor is configured to: determine, in the XML message, the independent message block in the XML message, and add the parent node for a node to which the determined independent message block belongs, where the node name of the added parent node is the target identifier.

According to a fifth aspect, a data receive end for message parsing is provided. The data receive end includes a plurality of modules, and the message parsing method provided in the first aspect can be implemented through a function of collaboration between the plurality of modules.

According to a sixth aspect, a data transmit end for message parsing is provided. The data transmit end includes a plurality of modules, and the message parsing method provided in the second aspect can be implemented through a function of collaboration between the plurality of modules.

According to a seventh aspect, a computer-readable storage medium is provided. The computer-readable storage medium stores instructions, and when the computer-readable storage medium runs at a data receive end, the data receive end is enabled to perform the method according to the first aspect.

According to an eighth aspect, a computer program product including instructions is provided. When the computer program product runs at a data receive end, the data receive end is enabled to perform the method according to the first aspect.

According to a ninth aspect, a computer-readable storage medium is provided. The computer-readable storage medium stores instructions, and when the computer-readable storage medium runs at a data transmit end, the data transmit end is enabled to perform the method according to the second aspect.

According to a tenth aspect, a computer program product including instructions is provided. When the computer program product runs at a data transmit end, the data transmit end is enabled to perform the method according to the second aspect.

According to an eleventh aspect, a message parsing system is provided. The system includes a data transmit end and a data receive end, where the data transmit end is the data transmit end according to the sixth aspect; and the data receive end is the data receive end according to the fifth aspect.

Beneficial effects brought by the technical solutions provided in the embodiments of this application include at least the following.

In the embodiments of this application, when creating the XML message, the data transmit end may add the target identifier to the XML message to indicate the independent message block in the XML message, where the independent message block is the independent context-free message block, and then may transmit the XML message to the data receive end; and in the process of receiving the XML message, if it is detected that the target identifier exists in the XML message, the data receive end may capture, from the XML message, the independent message block corresponding to the target identifier, and then parse the captured independent message block. In this way, in the process of receiving the XML message, the encountered independent message block can be directly captured and then parsed, and there is no need to cache the entire XML message in a memory. Therefore, a requirement on a memory storage capacity can be relatively reduced. The solution is applicable to parsing of a message with a large amount of data. Therefore, a manner of parsing a message with a large amount of data is provided.

In addition, memory can be saved in the embodiments of this application. Therefore, in a memory-limited scenario, fast message parsing and responding can be implemented, a service response, user interface (UI) refreshing, and the like can be quickly performed, and user experience can also be improved.

DETAILED DESCRIPTION OF ILLUSTRATIVE EMBODIMENTS

To make the objectives, technical solutions, and advantages of this application clearer, the following further describes the implementations of this application in detail with reference to the accompanying drawings.

For ease of understanding of the embodiments of this application, the following first describes a system architecture and concepts of terms used in the embodiments of this application.

Figure 1:
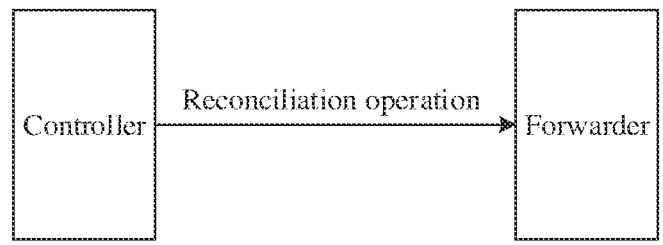
FIG. 1 is a schematic structural diagram of a reconciliation operation between devices according to an embodiment of this application.
Figure 2:
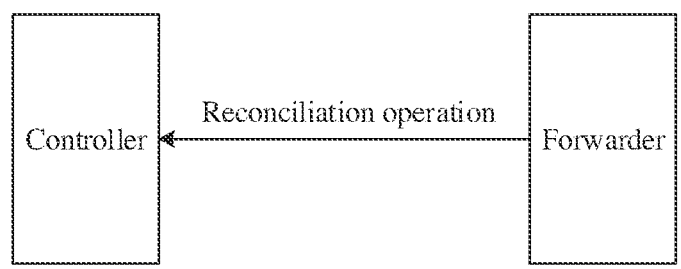
FIG. 2 is a schematic structural diagram of a reconciliation operation between devices according to an embodiment of this application.

The embodiments of this application are applicable to a data transmission system. The data transmission system includes a data transmit end and a data receive end. The data transmit end is configured to transmit a message, and the data receive end is configured to receive and parse the message. For example, in an SDN network, a controller performs a reconciliation operation with a forwarder. When the forwarder goes online and is managed by the controller, there are two reconciliation operation manners. As shown in FIG. 1, in forward reconciliation, configuration information of the controller is used, the controller is a data transmit end, and the forwarder is a data receive end. Alternatively, as shown in FIG. 2, in reverse reconciliation, configuration information of the forwarder is used, the controller is a data receive end, and the forwarder is a data transmit end.

The SDN network is a new network architecture mainly characterized in that a network control plane is implemented by using software. This architecture may enable a network administrator to replan the network in a central control mode by using a program without changing hardware devices. This architecture provides a new solution to network traffic control and also provides a good platform for a core network and application innovation.

A DOM is a standard programming interface recommended by the W3C organization for processing an extensible markup language. The DOM parses an XML document into a tree-like structure, where the structure is referred to as a node tree. After the DOM completes parsing, the entire XML tree-like structure can be accessed horizontally (between siblings) and vertically (between a parent and a child) by using a root node. That is, any node in an XML message corresponds to one DOM node in a memory. In other words, the DOM parsing manner requires that the entire XML message should be parsed before the XML message can be operated in the memory. This parsing manner has a high memory requirement and is suitable for parsing short and small messages.

A SAX is an event-driven XML application programming interface (API). Unlike the DOM, the SAX performs parsing from top to bottom in sequence during scanning. Therefore, the SAX has advantages of fast parsing and less memory occupation.

A NETCONF protocol is a network configuration management protocol defined in RFC 6241. The NETCONF protocol is a common configuration protocol used in a network device.

A reconciliation operation is a process of synchronizing data between a data receive end and a data transmit end.

An embodiment of this application provides a message parsing method. The method may be performed by a data receive end and a data transmit end. The data receive end may be any device that can receive an XML message, and the data transmit end may be a device that creates and transmits the XML message.

Figure 3:
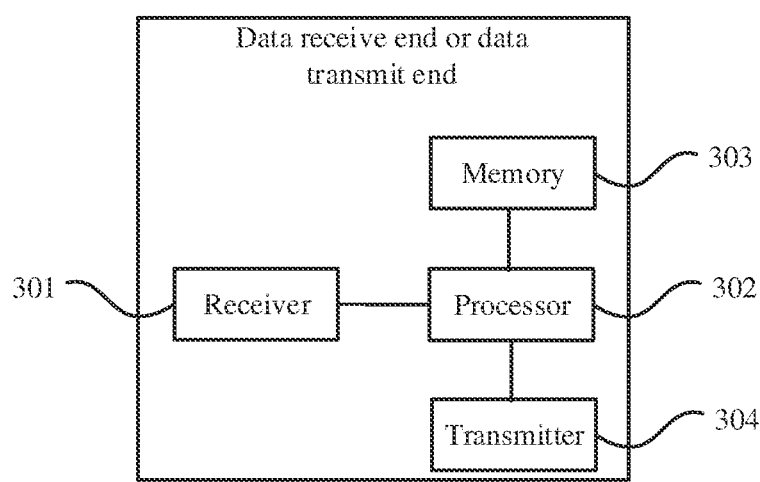
FIG. 3 is a schematic structural diagram of a data receive end or a data transmit end according to an embodiment of this application.

FIG. 3 is a schematic structural diagram of a data receive end and a data transmit end according to an embodiment of this application. Each of the data receive end and the data transmit end may include at least a receiver 301, a processor 302, a memory 303, and a transmitter 304. The receiver 301 may be configured to receive data, and may be specifically configured to receive an XML message. The transmitter 304 may be configured to transmit data, and may be specifically configured to transmit an XML message. The memory 303 may be configured to store a software program and module. The processor 302 performs various functional applications and data processing by running the software program and module stored in the memory 303. The memory 303 may mainly include a program storage area and a data storage area. The program storage area may store an operating system, an application program required for at least one function, and the like. The data storage area may store data created based on use of the data receive end, and the like. In addition, the memory 303 may include a high-speed random access memory, or may include a non-volatile memory, for example, at least one magnetic disk storage device, a flash memory, or other non-volatile solid-state storage devices. Correspondingly, the memory 303 may further include a memory controller, to allow the processor 302, the receiver 301, and the transmitter 304 to access the memory 303. The processor 302 is a control center of the data receive end. The processor 302 uses various interfaces and lines to connect all parts of the entire data receive end, and performs various functions and data processing of the data receive end by running or executing the software program and/or module stored in the memory 303 and invoking data stored in the memory 303, thereby performing overall monitoring on the data receive end.

Optionally, the processor 302 may include one or more processing cores. Preferably, the processor 302 may integrate an application processor and a modem processor. The application processor mainly processes the operating system, a user interface, an application program, and the like. The modem processor mainly processes wireless communication. It may be understood that the modem processor may alternatively not be integrated into the processor 302.

Figure 4:
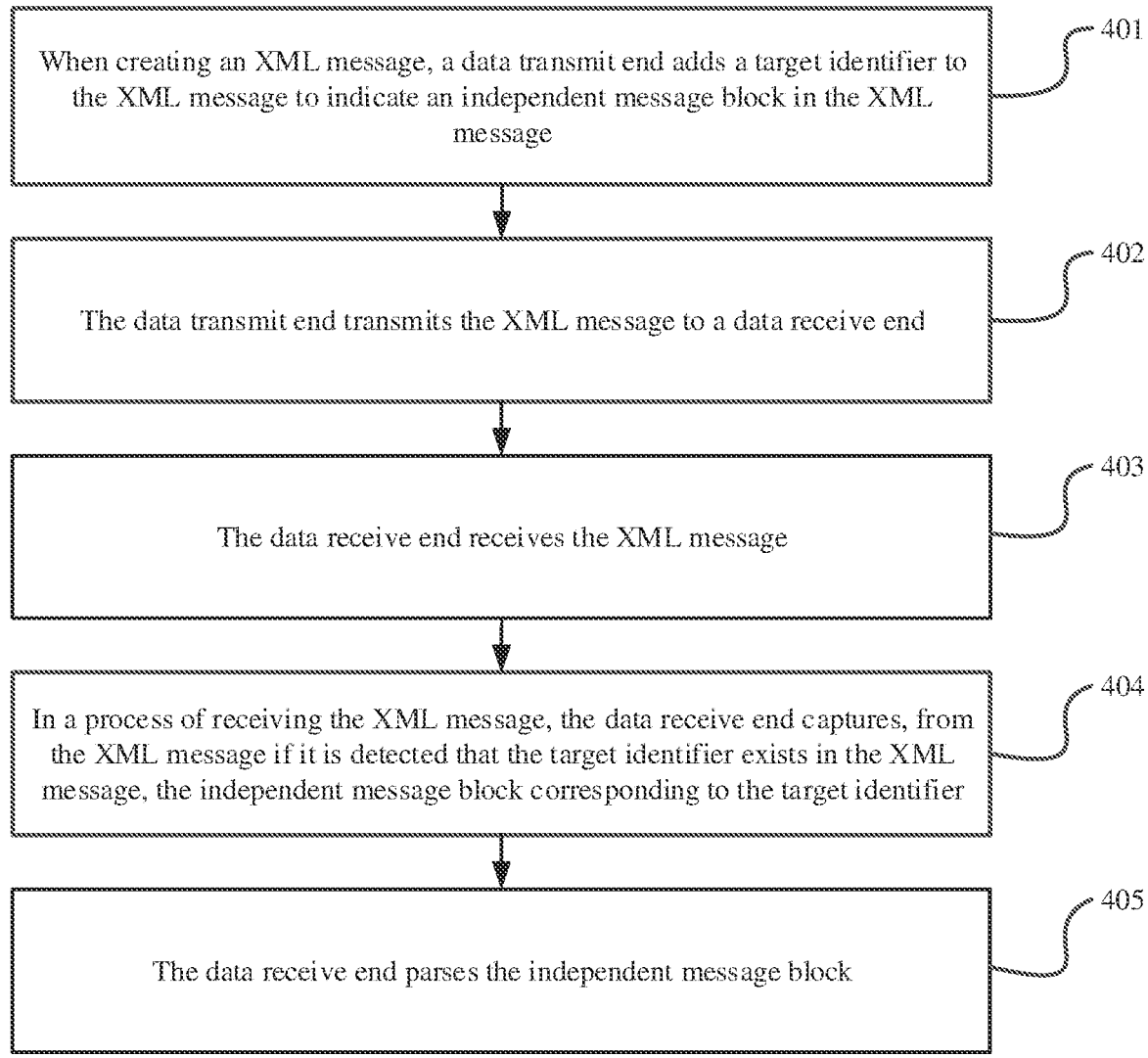
FIG. 4 is a schematic flowchart of a message parsing method according to an embodiment of this application.

An embodiment of this application provides a message parsing method, applied to a data receive end and a data transmit end. As shown in FIG. 4, a processing procedure of the method may be as follows.

Step 401: When creating an XML message, the data transmit end adds a target identifier to the XML message to indicate an independent message block in the XML message, where the independent message block is an independent context-free message block.

In implementation, the data transmit end needs to transmit an XML message to the data receive end. During creation of the XML message, if a message block in the XML message is an independent context-free message block, the message block is an independent message block, and a target identifier may be added to the independent message block. If no message block in the XML message is an independent context-free message block, the XML message may be directly created.

Optionally, the target identifier may be an attribute value of an attribute of a node; and correspondingly, the process of adding a target identifier may be as follows: determining, in the XML message, the independent message block in the XML message; and setting the attribute value of the attribute of the node to which the determined independent message block belongs, to the target identifier.

In implementation, a message body of an XML language itself is generally a tree-like structure, where each node includes a node name, a name space, a node value, an attribute, and an attribute value. Therefore, at the data transmit end, an identifier (that is, the target identifier) may be added for the node to which the independent (that is, context-free) message block belongs, and the identifier is presented in a manner of the attribute of the node. For example, "fragment="independent"", where "fragment" is an attribute, and "independent" is an attribute value. In this way, when an attribute value of an attribute of a node is a target identifier, it indicates that an independent message block corresponding to the node may be parsed independently of a context. To be specific, the data transmit end may determine, in the XML message, the context-free message block as the independent message block, then obtain an identifier bit of the attribute value of the attribute of the node to which the determined independent message block belongs, and add the target identifier to the identifier bit. In this way, the attribute value of the attribute of the node to which the determined independent message block belongs is the target identifier.

Optionally, the target identifier is a node name of a parent node; and correspondingly, the process of adding a target identifier may be as follows: determining, in the XML message, the independent message block in the XML message; and adding the parent node for a node to which the determined independent message block belongs, where the node name of the added parent node is the target identifier.

In implementation, the independent message block that is independently parsed (that is, the independent message block that can be parsed without using the context) is identified by defining a new XML upper-layer node (not limited to a specific node name herein). As mentioned above, the XML language itself is a tree-like structure, where each node consists of a node name, a name space, a node value, an attribute, and an attribute value. At the data transmit end, a new node whose node name is a target identifier is added as a parent node, and an independent message block that can be independently parsed is used as a child node of the parent node. In this way, when a node name of a parent node is a target identifier, it indicates that an independent message block of a child node included in the parent node may be parsed independently of a context. To be specific, the data transmit end may determine, in the XML message, the context-free message block as the independent message block, and then add the parent node whose node name is the target identifier for the node to which the determined independent message block belongs. In this way, the node name of the added parent node is the target identifier.

Step 402: The data transmit end transmits the XML message to the data receive end.

In implementation, after creating the XML message, the data transmit end may transmit the created XML message to the data receive end.

Step 403: The data receive end receives the XML message.

In implementation, the data receive end may continuously receive a character stream including the XML message transmitted by the data transmit end.

Step 404: In a process of receiving the XML message, the data receive end captures, from the XML message if it is detected that the target identifier exists in the XML message, the independent message block corresponding to the target identifier.

The target identifier may be preset and stored at the data receive end. The target identifier may be used to represent that the corresponding message block is an independent context-free independent message block.

In implementation, in the process of receiving the character stream including the XML message transmitted by the data transmit end, the data receive end may detect whether the target identifier exists in the received XML message, and if the target identifier exists, the data receive end may capture, from the XML message, the independent message block corresponding to the target identifier. In this way, the independent context-free independent message block can be obtained.

Optionally, a start point and an end point of the independent message block corresponding to the target identifier may be first determined, and then the independent message block is captured. The corresponding process may be as follows.

In the XML message, determining, leftward from a location of the target identifier, the start point of the independent message block corresponding to the target identifier, and determining, rightward from the location of the target identifier, the end point of the independent message block corresponding to the target identifier; and capturing, from the XML message based on the start point and the end point, the independent message block corresponding to the target identifier.

In implementation, when it is determined that the target identifier exists in the XML message, the start point of the independent message block corresponding to the target identifier may be determined leftward from the location of the target identifier, and the end point of the independent message block corresponding to the target identifier may be determined rightward from the location of the target identifier; and then the independent message block between the start point and the end point may be captured from the XML message. In this way, the independent message block corresponding to the target identifier can be captured.

For example, in the XML message <block0>xxxxxxxx </block0><block1 fragment="independent"></block1><block2></block2>, the target identifier is "independent". After the target identifier is found, the start point <block1 is found leftward and the end point </block1> is found rightward. Therefore, the captured independent message block is <block1 fragment="independent"></block1>.

It should be noted that because the XML language has its own features, the start point and the end point can be found.

Optionally, in the XML message, the target identifier may be any identifier that can represent the independent message block. The following provides two feasible implementations:

Implementation 1: The target identifier is an attribute value of an attribute of a node. If it is detected that an attribute value of an attribute of a target node in the XML message is the target identifier, the independent message block corresponding to the target identifier is captured from the XML message based on the target node.

In implementation, when detecting that the attribute value of the attribute of the node (that is, the target node) in the message is the target identifier, the data receive end may capture, from the XML message based on the target node, the independent message block corresponding to the target identifier.

Optionally, the independent message block corresponding to the target identifier is captured based on whether the target node includes any child node. The corresponding process may be as follows: if the target node does not include any child node, capturing, from the XML message, an independent message block corresponding to the target node; or if the target node includes a child node, capturing, from the XML message, independent message blocks corresponding to the target node and the child node included in the target node.

In implementation, when detecting that the attribute value of the attribute of the node (that is, the target node) in the message is the target identifier, the data receive end may determine whether the target node includes any child node. If the target node does not include any child node, a start point and an end point of the independent message block corresponding to the target node may be determined, and then the independent message block between the start point and the end point is captured from the XML message. If the target node includes a child node, start points and end points of independent message blocks corresponding to the target node and the child node included in the target node may be determined, and then the independent message blocks between the start points and the end points are captured from the XML message.

For example, in an SDN network, when a forward reconciliation operation is performed between a controller and a forwarder (that is, the controller synchronizes its own configuration to the forwarder), during creation of a configured XML message, a target identifier "independent" is added to a top-layer node (that is, a "<fast>" node), as shown below:

```
<rpc message-id="3" xmlns="urn:ietf:params:xml:ns:netconf:base:1.0">
    <copy-config>
    ..........
        <source>
            <config>
                <bbf-fast:fastxmlns:bbf-fast="urn:bbf:yang:bbf-fast"fragment=
"independent">
                    <bbf-fast:service>
                        <bbf-fast:time-division-duplexing-profile>
                            <bbf-fast:name>danda1n</bbf-fast:name>
                            <bbf-fast:cyclic-extension>10</bbf-fast:cyclic-extension>
                    <bbf-fast:downstream-symbol-periods>15</bbf-fast:downstream-symbol-
periods>
                            <bbf-fast:total-symbol-periods>36</bbf-fast:total-symbol-periods>
                        </bbf-fast:time-division-duplexing-profile>
                        <bbf-fast:time-division-duplexing-profile>
                            <bbf-fast:name>mengbiyousi</bbf-fast:name>
                            <bbf-fast:cyclic-extension>10</bbf-fast:cyclic-extension>
                        </bbf-fast:time-division-duplexing-profile>
                    </bbf-fast:service>
                </bbf-fast:fast>
            ..........
            </config>
        </source>
    </copy-config>
</rpc>
``` where "independent" is an attribute value of an attribute of the <fast> node. By using an XML syntax feature, a start point of an independent message block corresponding to the target identifier may be obtained leftward and is a "<" position in <bbf, and an end point of the independent message block corresponding to the target identifier may be obtained rightward and is a ">" position in </bbf-fast:fast>.

It should be noted that when the target node includes a child node, independent message blocks corresponding to the target node and the child node included in the target node are independent. Therefore, the independent message blocks corresponding to the target node and the child node included in the target node may be captured.

Implementation 2: The target identifier is a node name of a parent node. If it is detected that the parent node whose node name is the target identifier exists in the XML message, an independent message block corresponding to a child node included in the parent node whose node name is the target identifier is captured from the XML message.

In implementation, when determining that the node name of the parent node is the target identifier, the data receive end may determine the child node included in the parent node, then determine a start point and an end point of the independent message block corresponding to the child node, and then capture the independent message block between the start point and the end point from the XML message, where the independent message block is an independent message block that can be independently parsed.

For example, in an SDN network, when a forward reconciliation operation is performed between a controller and a forwarder (that is, the controller synchronizes its own configuration to the forwarder), during creation of a configured XML message, a parent node <independent-fragment-root> is added for a <fast> node, as shown below:

```
<rpc message-id="3" xmlns="urn:ietf:params:xml:ns:netconf:base:1.0">
  <copy-config>
    ..........
    <source>
      <config>
        <independent-fragment-root>
          <bbf-fast:fast xmlns:bbf-fast="urn:bbf:yang:bbf-fast">
            <bbf-fast:service>
              <bbf-fast:time-division-duplexing-profile>
                <bbf-fast:name>dandaln</bbf-fast:name>
                <bbf-fast:cyclic-extension>10</bbf-fast:cyclic-extension>
          <bbf-fast:downstream-symbol-periods>15</bbf-fast:downstream-symbol-periods>
                <bbf-fast:total-symbol-periods>36</bbf-fast:total-symbol-periods>
              </bbf-fast:time-division-duplexing-profile>
              <bbf-fast:time-division-duplexing-profile>
                <bbf-fast:name>mengbiyousi</bbf-fast:name>
                <bbf-fast:cyclic-extension>10</bbf-fast:cyclic-extension>
          <bbf-fast:downstream-symbol-periods>15</bbf-fast:downstream-symbol-periods>
                <bbf-fast:total-symbol-periods>36</bbf-fast:total-symbol-periods>
              </bbf-fast:time-division-duplexing-profile>
            </bbf-fast:service>
          </bbf-fast:fast>
        </independent-fragment-root>
        ..........
</rpc>
```

An independent message block between <independent-fragment-root> and </independent-fragment-root> is an independent message block that is independently parsed.

It should be noted that the target identifier is only examples.

Step 405: The data receive end parses the independent message block.

In implementation, after obtaining the independent context-free independent message block, the data receive end may deliver the independent message block to a parsing thread pool, and start a parsing thread for parsing.

It should be noted that because the captured independent message block is generally relatively small, a DOM may be directly used for parsing. For example, the independent message block is:

```
<body>
  <div/>
  <ul>
    <li>
    <li>
  </ul>
</body>
```

Figure 5:
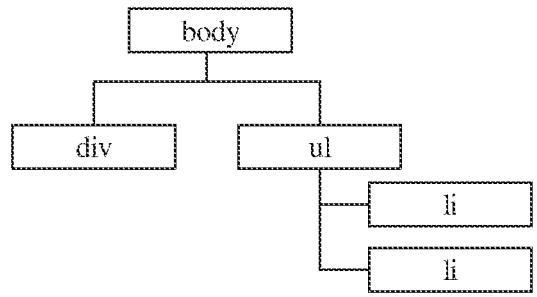
FIG. 5 is a schematic diagram of a node tree according to an embodiment of this application.

An XML tree-like structure obtained by parsing is shown in FIG. 5, where a body is a parent node of div and ul, div and ul are child nodes of the body, and div and ul are sibling nodes.

Figure 6:
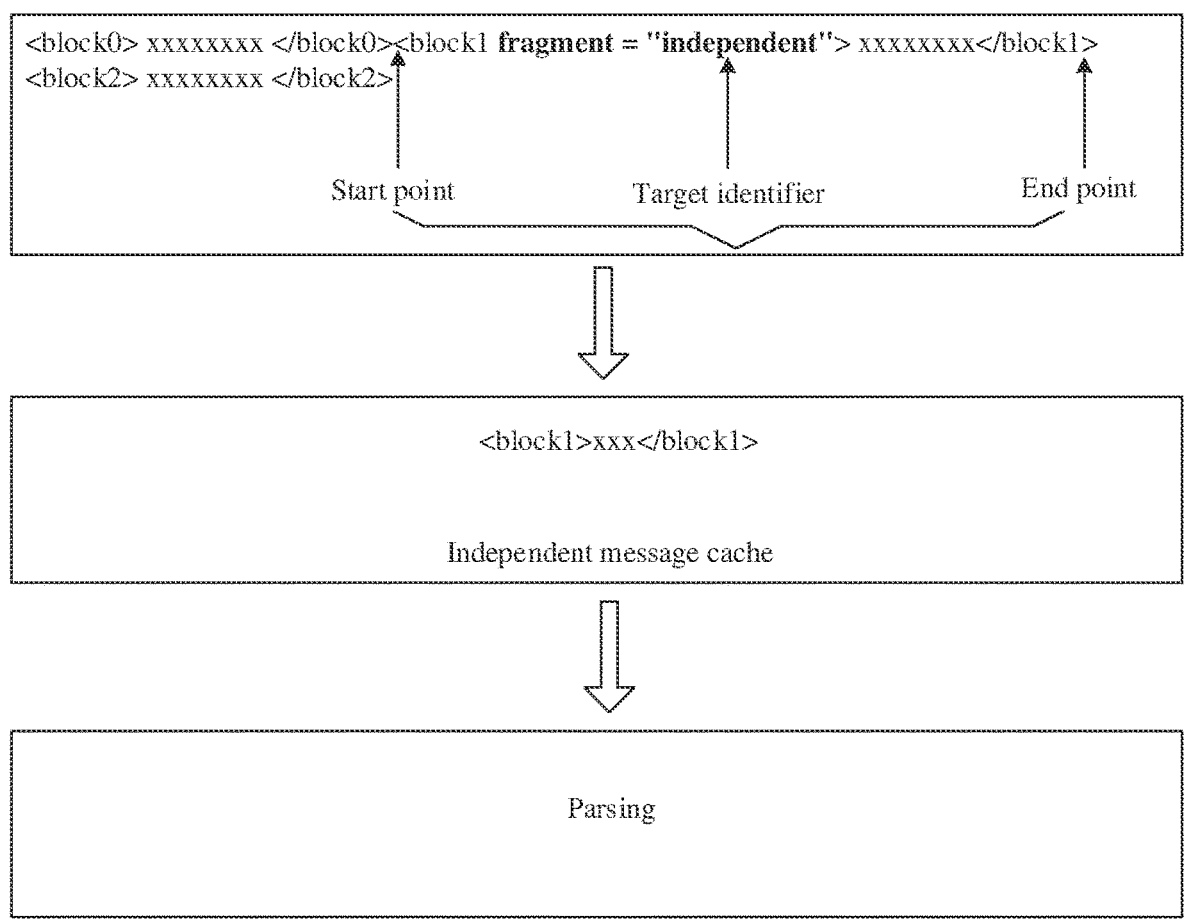
FIG. 6 is a schematic diagram for parsing an independent message block according to an embodiment of this application.
Figure 7:
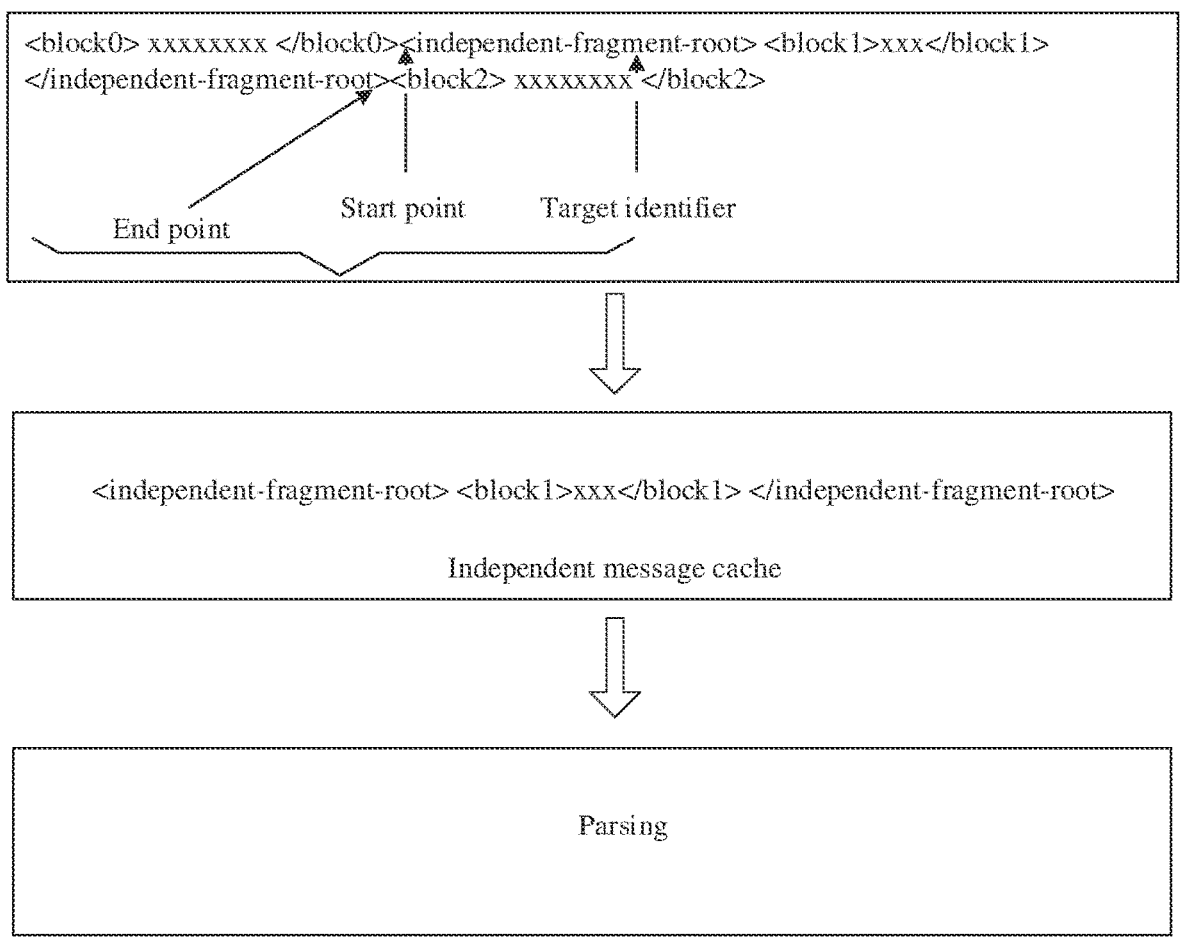
FIG. 7 is a schematic diagram for parsing an independent message block according to an embodiment of this application.

In addition, after capturing the independent message block, the data receive end may add the independent message block to an independent message cache (the independent message cache is different from caches of messages other than the captured independent message block in the XML message). Then a parsing task manager identifies that there is an independent message block that can be parsed in the independent message cache, and may start a parsing thread for parsing. As shown in FIG. 6, for the foregoing implementation 1, a schematic diagram of a parsing procedure is provided. A<block1> node is a target node. A start point of an independent message block corresponding to a target identifier is "<" in <block1>, and an end point is ">" in </block1>. A captured independent message block is an independent message block between "<" in <block1> and ">" in </block1>. That is, the independent message block added to the independent message cache is the independent message block between "<" in <block1> and ">" in </block1>. Then the parsing thread performs parsing. As shown in FIG. 7, for the foregoing implementation 2, a schematic diagram of a parsing procedure is provided. An independent message block corresponding to a <block1> node is an independent message block. A start point of an independent message block corresponding to a target identifier is "<" in <independent-fragment-root>, and an end point is ">" in </independent-fragment-root>. A captured independent message block is an independent message block between "<" in <independent-fragment-root> and ">" in </independent-fragment-root>. That is, the independent message block added to the independent message cache is the independent message block between "<" in <independent-fragment-root> and ">" in </independent-fragment-root>. Then the parsing thread performs parsing.

Optionally, for a node whose target identifier does not exist, parsing may be performed through a SAX. The corresponding process may be as follows: parsing, through the SAX, a message of a node whose target identifier does not exist in the XML message.

In implementation, for nodes whose target identifiers do not exist, the data receive end may obtain messages of these nodes, and parse the messages through the SAX, that is, after all the messages of these nodes are received, the data receive end may read the messages from the cache line by line, identify the following events, such as an XML start, an XML end, a tag start, a tag end, a substring value, and an exception, and trigger parsing in each event.

Optionally, if no target identifier exists in the XML message, the XML message may be parsed through the SAX. The corresponding process may be as follows: if it is detected that no target identifier exists in the XML message, parsing the XML message through the SAX.

In implementation, if the data receive end does not detect any target identifier in the entire XML message, the data receive end may parse the XML message through the SAX, that is, after the XML message is cached, the data receive end reads the XML message from the cache line by line, identifies the following events, such as an XML start, an XML end, a tag start, a tag end, a substring value, and an exception, and triggers parsing in each event.

It should be noted that in this embodiment of this application, the foregoing message parsing method may be not only applied to message reception between network devices in the SDN network, but also applied to message transmission between any functional entities that carry a message based on an XML syntax, for example, data synchronization between a mobile terminal and a cloud server, and data synchronization between different service nodes in a cluster environment.

In this embodiment of this application, when creating the XML message, the data transmit end may add the target identifier to the XML message to indicate the independent message block in the XML message, where the independent message block is the independent context-free message block, and then may transmit the XML message to the data receive end; and in the process of receiving the XML message, if it is detected that the target identifier exists in the XML message, the data receive end may capture, from the XML message, the independent message block corresponding to the target identifier, and then parse the captured independent message block. In this way, in the process of receiving the XML message, the encountered independent message block can be directly captured and then parsed, and there is no need to cache the entire XML message in a memory. Therefore, a requirement on a memory storage capacity can be relatively reduced. The solution is applicable to parsing of a message with a large amount of data. Therefore, a manner of parsing a message with a large amount of data is provided.

In addition, memory can be saved in this embodiment of this application. Therefore, in a memory-limited scenario, fast message parsing and responding can be implemented, a service response, user interface (UI) refreshing, and the like can be quickly performed, and user experience can also be improved.

Figure 8:
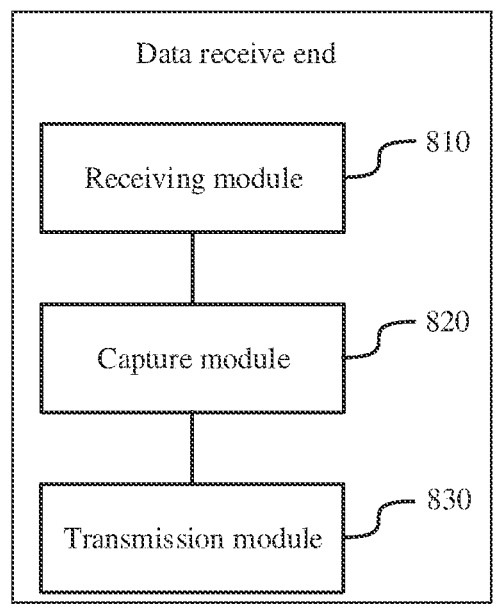
FIG. 8 is a schematic structural diagram of a data receive end according to an embodiment of this application.

FIG. 8 is a structural diagram of a data receive end according to an embodiment of this application. The data receive end may be implemented as a part or an entirety of a terminal by using software, hardware, or a combination thereof. The data receive end for message parsing according to this embodiment of this application may implement the procedure in FIG. 4 in the embodiment of this application. The data receive end includes a receiving module 810, a capture module 820, and a parsing module 830.

The receiving module 810 is configured to receive an extensible markup language XML message.

The capture module 820 is configured to: in a process of receiving the XML message, capture, from the XML message if it is detected that a target identifier exists in the XML message, an independent message block corresponding to the target identifier.

The parsing module 830 is configured to parse the independent message block.

Optionally, the parsing module 830 is further configured to: parse, through a SAX, a message block of a node whose target identifier does not exist in the XML message.

Optionally, the parsing module 830 is further configured to: if it is detected that no target identifier exists in the XML message, parse the XML message through the SAX.

Optionally, the capture module 820 is configured to: in the XML message, determine, leftward from a location of the target identifier, a start point of the independent message block corresponding to the target identifier, and determine, rightward from the location of the target identifier, an end point of the independent message block corresponding to the target identifier; and capture, from the XML message based on the start point and the end point, the independent message block corresponding to the target identifier.

Optionally, the target identifier is an attribute value of an attribute of a node; and the capture module 820 is configured to: if it is detected that an attribute value of an attribute of a target node in the XML message is the target identifier, capture, from the XML message based on the target node, the independent message block corresponding to the target identifier.

Optionally, the capture module 820 is configured to: if the target node does not include any child node, capture, from the XML message, an independent message block corresponding to the target node; or if the target node includes a child node, capture, from the XML message, independent message blocks corresponding to the target node and the child node included in the target node.

Optionally, the target identifier is a node name of a parent node; and the capture module 820 is configured to: if it is detected that a parent node whose node name is the target identifier exists in the XML message, capture, from the XML message, an independent message block corresponding to a child node included in the parent node whose node name is the target identifier.

In this embodiment of this application, when creating the XML message, the data transmit end may add the target identifier to the XML message to indicate the independent message block in the XML message, where the independent message block is the independent context-free message block, and then may transmit the XML message to the data receive end; and in the process of receiving the XML message, if it is detected that the target identifier exists in the XML message, the data receive end may capture, from the XML message, the independent message block corresponding to the target identifier, and then parse the captured independent message block. In this way, in the process of receiving the XML message, the encountered independent message block can be directly captured and then parsed, and there is no need to cache the entire XML message in a memory. Therefore, a requirement on a memory storage capacity can be relatively reduced. The solution is applicable to parsing of a message with a large amount of data. Therefore, a manner of parsing a message with a large amount of data is provided.

It should be noted that when the data receive end provided in the foregoing embodiment performs message parsing, division of the foregoing functional modules is merely used as an example for description. In actual application, the foregoing functions may be allocated to different functional modules for implementation according to a requirement. That is, an internal structure of the data receive end is divided into different functional modules, to implement all or some of the functions described above. In addition, the data receive end provided in the foregoing embodiment and the message parsing method embodiment belong to a same concept. For a specific implementation process, refer to the method embodiment. Details are not described again herein.

Figure 9:
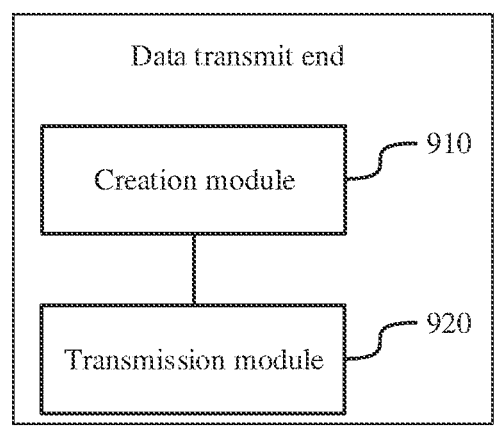
FIG. 9 is a schematic structural diagram of a data transmit end according to an embodiment of this application.

FIG. 9 is a structural diagram of a data transmit end for message parsing according to an embodiment of this application. The data transmit end may be implemented as a part or an entirety of a terminal by using software, hardware, or a combination thereof. The data transmit end for message parsing according to this embodiment of this application may implement the procedure in FIG. 4 in the embodiment of this application. The data transmit end includes a creation module 910 and a transmission module 920.

The creation module 910 is configured to: when creating an extensible markup language XML message, add a target identifier to the XML message to indicate an independent message block in the XML message, where the independent message block is an independent context-free message block.

The transmission module 920 is configured to transmit the XML message to a data receive end.

Optionally, the target identifier is an attribute value of an attribute of a node; and the creation module 910 is configured to: determine, in the XML message, the independent message block in the XML message, and set the attribute value of the attribute of the node to which the determined independent message block belongs, to the target identifier.

Optionally, the target identifier is a node name of a parent node; and the creation module 910 is configured to: determine, in the XML message, the independent message block in the XML message, and add the parent node for a node to which the determined independent message block belongs, where the node name of the added parent node is the target identifier.

In this embodiment of this application, when creating the XML message, the data transmit end may add the target identifier to the XML message to indicate the independent message block in the XML message, where the independent message block is the independent context-free message block, and then may transmit the XML message to the data receive end; and in the process of receiving the XML message, if it is detected that the target identifier exists in the XML message, the data receive end may capture, from the XML message, the independent message block corresponding to the target identifier, and then parse the captured independent message block. In this way, in the process of receiving the XML message, the encountered independent message block can be directly captured and then parsed, and there is no need to cache the entire XML message in a memory. Therefore, a requirement on a memory storage capacity can be relatively reduced. The solution is applicable to parsing of a message with a large amount of data. Therefore, a manner of parsing a message with a large amount of data is provided.

It should be noted that when the data transmit end provided in the foregoing embodiment performs message parsing, division of the foregoing functional modules is merely used as an example for description. In actual application, the foregoing functions may be allocated to different functional modules for implementation according to a requirement. That is, an internal structure of the data transmit end is divided into different functional modules, to implement all or some of the functions described above. In addition, the data transmit end provided in the foregoing embodiment and the message parsing method embodiment belong to a same concept. For a specific implementation process, refer to the method embodiment. Details are not described again herein.

An embodiment of this application further provides a computer-readable storage medium. The computer-readable storage medium stores instructions, and when the computer-readable storage medium runs at a data receive end, the data receive end is enabled to perform the steps of the foregoing message parsing method.

An embodiment of this application further provides a computer program product including instructions. When the computer program product runs at a data receive end, the data receive end is enabled to perform the steps of the foregoing message parsing method.

An embodiment of this application further provides a computer-readable storage medium. The computer-readable storage medium stores instructions, and when the computer-readable storage medium runs at a data transmit end, the data transmit end is enabled to perform the steps of the foregoing message parsing method.

An embodiment of this application further provides a computer program product including instructions. When the computer program product runs at a data transmit end, the data transmit end is enabled to perform the steps of the foregoing message parsing method.

An embodiment of this application further provides a message parsing system. The system includes a data transmit end and a data receive end.

The data transmit end is the data transmit end shown in FIG. 8; and the data receive end is the data receive end shown in FIG. 9.

All or some of the foregoing embodiments may be implemented by using software, hardware, firmware, or any combination thereof. When implemented by using software, all or some of the foregoing embodiments may be implemented in a form of a computer program product. The computer program product includes one or more computer instructions, and when the computer program instructions are loaded and executed on a network device, all or some of the procedures or functions described in the embodiments of this application are generated. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial optical cable, an optical fiber, or a digital subscriber line) or wireless (for example, infrared, radio, or microwave) manner. The computer-readable storage medium may be any usable medium accessible by a network device, or a data storage device, such as a server or a data center, integrating one or more usable media. The usable medium may be a magnetic medium (for example, a floppy disk, a hard disk, or a magnetic tape), an optical medium (for example, a digital video disk (DVD), a semiconductor medium (for example, a solid-state drive).

The foregoing descriptions are merely feasible embodiments of this application, but are not intended to limit this application. Any modification, equivalent replacement, or improvement made without departing from the spirit and principle of this application should fall within the protection scope of this application.

What is claimed is:

1. A method, comprising:
receiving an extensible markup language (XML) message;
in a process of receiving the XML message, and in response to detecting that a target identifier indicating an independent message block exists in the XML message, capturing, from the XML message, the independent message block corresponding to the target identifier, wherein the independent message block is an independent context-free message block, and wherein the target identifier is an attribute value of an attribute of a target node, and the capturing the independent message block comprises: in response to detecting that the attribute value of the attribute of the target node in the XML message is the target identifier, capturing, from the XML message based on the target node, the independent message block corresponding to the target identifier, or wherein the target identifier is a node name of a parent node and the capturing the independent message block comprises: in response to detecting that the parent node whose node name is the target identifier exists in the XML message, capturing, from the XML message, the independent message block corresponding to a child node comprised in the parent node whose node name is the target identifier; and parsing the independent message block.

2. The method according to claim 1, further comprising: parsing, through a Simple API for XML (SAX), a message block of a node whose target identifier is not comprised in the XML message.

3. The method according to claim 1, further comprising: in response to detecting that no target identifier exists in the XML message, parsing the XML message through a Simple API for XML (SAX).

4. The method according to claim 1, wherein the capturing, from the XML message, the independent message block corresponding to the target identifier comprises:

in the XML message, determining, leftward from a location of the target identifier, a start point of the independent message block corresponding to the target identifier, and determining, rightward from the location of the target identifier, an end point of the independent message block corresponding to the target identifier; and capturing, from the XML message based on the start point and the end point, the independent message block corresponding to the target identifier.

5. The method according to claim 1, wherein the capturing, from the XML message based on the target node, the independent message block corresponding to the target identifier comprises:

when the target node does not comprise any child node, capturing, from the XML message, the independent message block corresponding to the target node; or when the target node comprises the child node, capturing, from the XML message, independent message blocks corresponding to the target node and the child node comprised in the target node.

6. A data receive end, comprising:
a receiver, configured to receive an extensible markup language (XML) message;
a processor; and
a memory, configured to store a program; and
wherein the processor is configured to run the program to cause the data receive end to perform operations including:
in a process of receiving the XML message, and in response to detecting that a target identifier indicating an independent message block exists in the XML message, capturing, from the XML message, the independent message block corresponding to the target identifier, wherein the independent message block is an independent context-free message block, and wherein the target identifier is an attribute value of an attribute of a target node, and the capturing the independent message block comprises: in response to detecting that the attribute value of the attribute of the target node in the XML message is the target identifier, capturing, from the XML message based on the target node, the independent message block corresponding to the target identifier, or wherein the target identifier is a node name of a parent node and the capturing the independent message block comprises: in response to detecting that the parent node whose node name is the target identifier exists in the XML message, capturing, from the XML message, the independent message block corresponding to a child node comprised in the parent node whose node name is the target identifier; and parsing the independent message block.

7. The data receive end according to claim 6, wherein the operations further comprising:
parsing, through a Simple API for XML (SAX), a message block of a node whose target identifier is not comprised in the XML message.

8. The data receive end according to claim 6, the operations further comprising:
in response to detecting that no target identifier exists in the XML message, parsing the XML message through a Simple API for XML (SAX).

9. The data receive end according to claim 6, the capturing the independent message block corresponding to the target identifier comprising:

in the XML message, determining, leftward from a location of the target identifier, a start point of the independent message block corresponding to the target identifier, and determine, rightward from the location of the target identifier, an end point of the independent message block corresponding to the target identifier; and capturing, from the XML message based on the start point and the end point, the independent message block corresponding to the target identifier.

10. The data receive end according to claim 6, the capturing the independent message block corresponding to the target identifier comprising:

when the target node does not comprise any child node, capturing, from the XML message, the independent message block corresponding to the target node; or when the target node comprises the child node, capturing, from the XML message, independent message blocks corresponding to the target node and the child node comprised in the target node.

11. A data transmit end, comprising:
a transmitter;
a processor; and
a memory, configured to store a program;
wherein the processor is configured to run the program to cause the data transmit end to perform operations including:
when creating an extensible markup language (XML) message, adding a target identifier to the XML message indicating an independent message block in the XML message, wherein the independent message block is an independent context-free message block, and wherein the target identifier is an attribute value of an attribute of a node, and the operations further including: determining, in the XML message, the independent message block in the XML message, and setting the attribute value of the attribute of the node to which the independent message block belongs, to the target identifier, or wherein the target identifier is a node name of a parent node, and the operations further including: determining, in the XML message, the independent message block in the XML message, and adding the parent node for a node to which the independent message block belongs, wherein the node name of the parent node is the target identifier; and transmitting the XML message to a data receive end.

12. The method according to claim 1, wherein the independent message block corresponding to the target identifier is captured based on whether the target node of the independent message block includes any child node.

13. The method according to claim 1, wherein the target identifier is the attribute value of the attribute of a "<fast>" node for configuring a reconciliation operation, or wherein the target identifier is the node name of the parent node of the "<fast>" node.

* * * * *